United States Patent [19]
Omiya

[11] Patent Number: 5,240,206
[45] Date of Patent: Aug. 31, 1993

[54] AIRSHIP

[76] Inventor: Sousuke Omiya, 3-12, Minato-Shinden 2, Ichikawa-shi, Chiba, Japan

[21] Appl. No.: 756,750

[22] Filed: Sep. 9, 1991

[30] Foreign Application Priority Data

Oct. 31, 1990 [JP] Japan .................. 2-292128

[51] Int. Cl.⁵ .................... B64B 1/34; B64B 1/38
[52] U.S. Cl. ............................ 244/25; 244/26; 244/96
[58] Field of Search .......... 244/24, 25, 26, 29, 244/51, 52, 96

[56] References Cited

U.S. PATENT DOCUMENTS

| | | | |
|---|---|---|---|
| 2,062,018 | 11/1936 | Wheeler | 244/52 |
| 2,379,355 | 6/1945 | Hodgdon | 244/25 |
| 2,552,359 | 5/1951 | Winslow | 244/52 |
| 4,149,688 | 4/1979 | Miller, Jr. | 244/25 |
| 4,204,656 | 5/1980 | Seward, III | 244/31 |
| 4,773,617 | 9/1988 | McCampbell | 244/31 |
| 4,799,914 | 1/1989 | Hutchinson | 244/96 |

FOREIGN PATENT DOCUMENTS

| | | | |
|---|---|---|---|
| 47711 | 11/1977 | Fed. Rep. of Germany | 244/96 |
| 2630397 | 10/1989 | France | 244/26 |

Primary Examiner—Joseph F. Peters, Jr.
Assistant Examiner—Virna Lissi Ansley
Attorney, Agent, or Firm—Sughrue, Mion, Zinn, Macpeak & Seas

[57] ABSTRACT

An acrobatic airship capable of making a perfect somersault, and a 360 degree roll in a limited small air space, without utilizing high-powered thrusters or sophisticated automatic control mechanisms. The airship has a rather thick and round axi-symmetrically shaped hull equipped with a pair of reversible thrusters on each side of the hull's nose area. Each thruster is also equipped with a tilting mechanism, which enables the thrust vector orientation to be changed independently. The airship has a set of tail fins as attitude stabilizers which do not have movable control surfaces. This acrobatic airship can be designed as a manned or unmanned craft, and is ideal for use in advertising and also as a camera platform, an observation vehicle for hazardous environments, and in various other industrial applications.

3 Claims, 3 Drawing Sheets

AIRSHIP

FIELD OF THE INVENTION

The present invention relates to an airship capable of acrobatic performance.

DESCRIPTION OF THE PRIOR ART

An airship is an aircraft consisting of bags filled with a buoyant gas such as helium and of thrusters to drive it when flying in the air. Airships were originally developed for transportation of passengers and cargo, but are today used for a wide variety of purposes, such as for aerial land/sea transportation control, air pollution surveys, various types of aerial surveillance and observation, agricultural chemical spraying, aerial photographing and the like. Among the various types of airships in operation at present, small unmanned radio-controlled airships are attracting growing attention as a toy and also as a display object at indoor and outdoor exhibitions.

At present, there are two types of airships. One is the non-rigid type airship which has as its hull an envelope whose shape is maintained by internal pressurized gas. The other is the rigid type airship which is composed of a few gas-filled gas bags and a cage-like rigid structured hull which holds these gas bags inside.

These conventional type airships basically move only straight forward and can change directions only slowly. They are incapable of making swift pitch or roll motions. Acrobatic motions such as a 360-degree roll or a somersault are out of the question, and thus conventional airships are not so suitable for exhibiting purposes.

The objective of this invention is to provide an airship which is capable not only of going straight forward or changing directions, but also of making acrobatic motions such as a 360-degree rolling motion or a perfect somersault without utilizing any sophisticated automatic control mechanisms.

SUMMARY OF THE INVENTION

An airship according to the invention comprising: a hull having an axisymmetrical shape, the overall configuration of which is symmetrical with respect to horizontal and vertical planes which include the hull axis, the fineness ratio of the hull being 0.5-3.5, at least one bag installed inside of the hull and filled with bouyant gas, a pair of propulsion and attitude controlling means for yaw, pitch, and roll attitude control, one located on either side of the hull axis at a distance in the fore and aft direction from the hull nose not greater than 20% of the total hull length, and external tail fins which have a total fin area A of $$0.1 \times Q^{\frac{2}{3}} \leq A \leq 1.5 \times Q^{\frac{2}{3}},$$

wherein Q is the total hull volume.

The aforesaid propulsion and attitude control devices are either composed of two sets of tilting mechanisms and reversible thrusters which also have mechanisms for switching the thrust vectors between the forward and reverse directions, or composed of two sets of helicopter rotors which have collective pitch control mechanisms and cyclic pitch control mechanisms.

Conventional airships tend to have large fineness ratios (hull length divided by maximum hull diameter) of more than 4 for non-rigid airships, and 7-8 for rigid airships. Such large fineness ratios imply a long hull shape and a large moment of inertia in the pitch and yaw directions, and therefore low maneuverability. For this reason, the fineness ratio of the airship according to this invention is set to be 0.5-3.5 to obtain a smaller moment of inertia and high maneuverability.

The hull of the airship is statically and dynamically quasi-axisymmetrical with respect to horizontal and vertical sectional planes which include the hull axis. The reason for this is as follows:

In the case of conventional airships, the hull is designed to be statically and dynamically symmetrical with respect to a vertical sectional plane including the hull axis. However, owing to the large distance between the buoyancy center (hereafter called B.C.), which is on the hull axis, and the airship's center of gravity (hereafter called C.G.), which is near the gondola attached to the bottom of the hull, and also owing to the large moment of inertia in the directions of pitch, yaw and roll, the conventional airship is incapable of swiftly pulling its nose upward or downward (pitch motion) and incapable of quick right or left turn (yaw) or of swiftly rolling the hull clockwise or counterclockwise. Conventional airships are also incapable of making a 360 degree roll or a somersault. This is because when a conventional airship pulls up its nose, or makes a roll motion to a larger extent, the C.G. is raised and deflected away from the vertical line which includes its B.C., and, as a result, a large recovery moment towards the neutral attitude is generated. The maximum thrust of a conventional airship or the aerodynamic force generated in flight is not strong enough to overcome this recovery moment.

It is especially difficult for a conventional airship to make a somersault. In such a case, a centrifugal force large enough to enable the airship to make the somersault will not be generated at the beginning of the maneuver, and the diameter of the circle along which the C.G. turns during the somersault motion is very small. In addition to these, the turning speed is too slow. As a result, the moment working to restore the stable neutral attitude is much stronger than the moment working to make the somersault motion, so that the airship will not be able to complete the somersault, and will return to the neutral attitude from the upside-down attitude. This phenomenon is called "attitude recovery."

To solve the above problem, the airship according to the invention is designed to make the distance between its B.C. and C.G. as short as possible. Its hull shape is made symmetrical with respect to the horizontal and vertical sectional planes including the hull axis. As a result, the airship has greatly improved maneuverability and is capable of making a 360 degree roll motion and a somersault. To realize this high maneuverability, it is desirable to locate the C.G. under the B.C. by a distance not greater than 20% of the maximum hull radius.

Another factor which has a strong influence on the tendency toward "attitude recovery" is the surface area of external tail fins which contribute to the airship attitude stability. The larger the tail area becomes, the greater is the dynamic stability of roll and pitch motions (the time constant of the recovery tends to be longer), and as a result tendency toward "attitude recovery" during a somersault is decreased. On the other hand, when the tail fin area is too large, this not only increases the craft weight but also increase the airship's dynamic stability in pitch motion to the extent that it may prevent the airship from making a somersault.

The tail fin area which is not too large but still large enough to prevent the "attitude recovery" phenomenon is determined as follows:

$$0.1 \times Q^{\frac{2}{3}} \leq A \leq 1.5 \times Q^{\frac{2}{3}},$$

where A is the total tail fin areas, and Q is the hull volume.

In the airship according to this invention designed as set out in the foregoing, pitch, yaw and roll attitude controls during normal flight are conducted as follows:

CONTROL OF PITCH ANGLE

In the case where the propulsion and attitude control systems installed on left and right sides of the hull are consist of helicoptor rotors which respectively have a collective and a cyclic pitch control system (hereafter called simply 'helicopter rotor'), pitch angle deflection of the craft can be realized by controlling both rotor blades through cyclic pitch control systems, and thereby creating a moment to pull the airship nose up or down.

In the case where the propulsion and attitude control systems consist of reversible thrusters with tilting mechanisms, the craft's pitch angle control can be realized by using the tilting mechanisms to tilt both reversible thruster axes simultaneously in the same direction. Thus, if the airship's pitch angle deflection is continuously maintained, the airship is able to perform a somersault, one of the most difficult acrobatic maneuvers.

The yaw angle is controlled as follows:

In the case of using tiltable-reversible thrusters, one thrust vector is set forward and the other backward at the same time according to the desired yaw angle direction, while keeping the orientations of both thrusters to the front without tilting them.

In the case of helicoptor rotors, the airship's yaw angle can be controlled by inversely changing the collective pitch angles of the respective rotor blades in such way as to generate a moment in the desired yaw direction.

The roll angle is controlled as follows:

In the case of using tiltable-reversible thrusters, the roll direction and rolling speed can be controlled by two methods: (1) by tilting one thruster upward and the other downward to generate a pair of opposite thrusts simultaneously, and (2) by tilting both the right- and left-hand-side thrusters upward or downward and applying opposite thrusts according to the desired roll direction.

In the case of helicoptor rotors, roll angle can be controlled by generating a moment in the desired roll direction by changing the respective rotor collective pitch angles and thereby generating a deviation between the both rotor axis torques. The above attitude control methods enable the airship of the invention to achieve enhanced maneuverability without using any sophisticated control system and without losing the high energy efficiency that is a major inherent advantage of airships.

Fixed-wing aircraft and helicopters have little or no lift when they fly at a low velocity in their reversed postures. Therefore, in order to perform a somersault, these aircrafts need to have very high initial speed and to maintain the high air speed throughout the somersault motion so as to generate a centrifugal force large enough to support their weight while they are upside down. To obtain a large centrifugal force, these aircraft have to make a large-radius circular movement, which means that they need a large aerial space for executing a somersault. On the contrary, the weight of the airship according to the invention is supported by the hull buoyancy even in a reversed posture. Since it therefore does not need any centrifugal force to support its weight, it is able to perform a somersault even in a small aerial space—a great advantage for indoor exhibitory purposes.

DESCRIPTION OF THE PREFERRED EMBODIMENT

Figure 1:
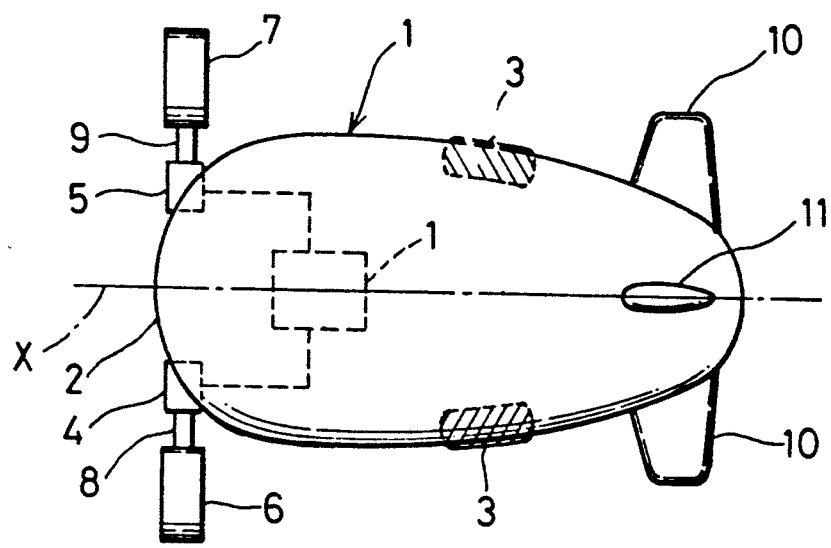
FIG. 1 is a plan view drawing of an embodiment of the airship according to the invention.
Figure 2:
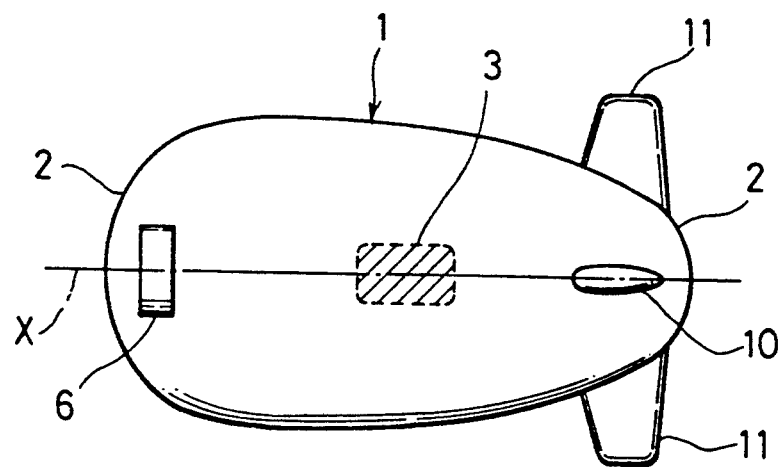
FIG. 2 is a front view of the airship of FIG. 1.
Figure 3:
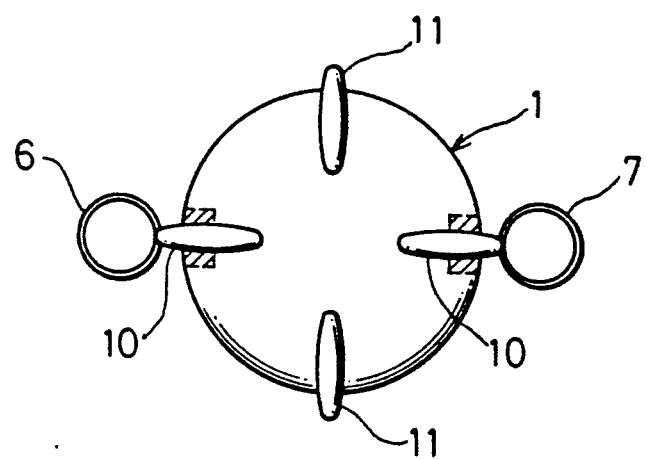
FIG. 3 is a left-side view of the same.

A preferred embodiment of the airship according to the invention will now be described in detail with reference to the figures. FIGS. 1, 2 and 3 show top, front, and left-side views of the embodiment. The hull 1 of the airship has a rotational-oval shape and is statically and dynamically axi-symmetrical with respect to the horizontal and vertical sectional planes including the hull axis. In other words, it is preferable for the C. G. of the hull 1 to be positioned at a point which is lower than the B. C. by a distance not greater than 20% of the maximum gas holding hull radius. In FIGS. 1-6, the buoyancy center is indicated by 12 and the center of gravity is indicated by 13. The above mentioned configuration of the hull includes the cases where the axis of the rotational-oval shape extends in the fore-aft, left-right, or up-down direction of the hull. It also includes the cases where the hull shape is thin in height or thin in width.

The fineness ratio of the hull is set to be between 0.5 and 3.5 so as to decrease the hull's moment of inertia and to improve controllability. This ratio is over 4 in the case of conventional airships.

Hull 1 consists of the gas bag 2 filled with a buoyant gas such as helium. The payload is divided to the left and right of the hull 1. In the case of conventional airships, the payload bay 3 is installed under the gas bag 2 in order to lower the C. G. and enhance the static stability of the hull 1. However, this decreases the controllability of the airship.

As mentioned earlier, however, if the hull 1 is axisymmetrically shaped, its controllability can be enhanced, and it will also become possible to stabilize the hull 1 by the control methods which will be explained below. It is also possible to install the payload bay 3 undividedly on one side of the hull and place a counterbalance on the other side. The payload bay 3 can also be installed on the top of or at the bottom of the hull 1, or even at the C. G. position. In such cases, it is necessary to make sure that the location of payload does not spoil the hull's symmetry.

To control the propulsion and the attitude of the hull 1, reversible thrusters (hereafter called simply "thrusters") 6, 7 are installed together, with tilting mechanisms 4, 5 on the left and right sides of the hull at a position not greater than 20% of the hull length from the hull nose station. This limitation on the position of the thrusters 6, 7 is for placing them as far forward as possible from the C. G. and the B. C. and also from the aerodynamic center, and for extending the arms of the attitude control moments as outward as possible. This arrangement makes it possible to realize effective pitch, yaw and roll attitude control against the airship's inherent large moment of inertia, especially at a low air speed when airships of this type easily sustain aerodynamic disturbances. The thrusters 6, 7 can be tilted by the tilting mechanisms 4, 5 around the axes 8, 9 which cross perpandicularly with the hull axis X within the horizontal plane. Although not shown in these figures, each of the above mentioned thrusters 6, 7 has an independent thrust control mechanism for changing its level of thrust and thrust vector direction (forward and backward). As this control mechanism is of the conventional type, it will not be described in details here.

Around the aft end of the hull 1, there are mounted the crusified or the x-letter shaped external tail fins 10, 11 constituted simply as stabilizers. The external tail fins 10, 11 are positioned so that their areal C. G. is located at a point in the fore and aft direction not greater than 30% of the hull length from the hull aft end. The total area A of these fins is determined within the following range:

$$0.1 \times Q^{\frac{2}{3}} \leq A \leq 1.5 \times Q^{\frac{2}{3}},$$

where Q is the volume of the hull 1.

The external tail fins 10, 11 are designed to satisfy the aforesaid conditions in order to ensure well-balanced controllability and stability. Special attention is given to the determination of the area of the tail fins because airships show a stronger attitude recovery tendency while making a somersault motion if the total area A of the external tail fins is less than $0.1 \times Q^{\frac{2}{3}}$, and on the other hand, if A is more than $1.5 \times Q^{\frac{2}{3}}$, although the airship will have smaller attitude recovery tendency and higher pitching stability, its hull weight will increase and make the airship less capable of executing a somersault.

Figure 4:
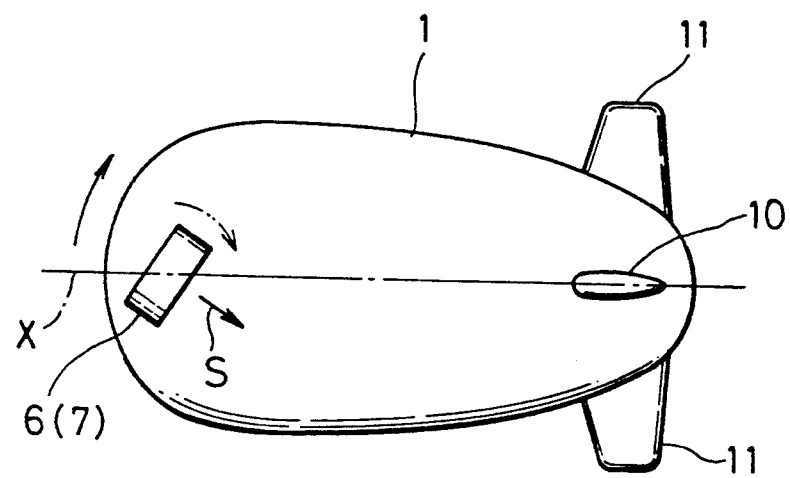
FIG. 4 is a side view of the same for explaining pitch angle controls.

The attitude angles of an airship with the above-mentioned configuration can be controlled as follows:

Pitching angle can be controlled by using the tilting mechanisms 4, 5 to tilt the thrusters 6 and 7 simultaneously, as shown in FIG. 4, and directing the thrust vectors diagonally upward in the opposite direction indicated by the arrow S which shows the direction of thrusters' ejected air flow. If this pitch angle deflection is continuously maintained, the airship will perform a somersault, one of the most difficult acrobatic flight techniques. The radius of the circular somersault trajectory can be made smaller by directing the vector of propulsion in the vertically upward direction, and an even much smaller radius circular somersault can be achieved by directing it in the upward and backward direction.

Yaw angle can be controlled by switching the thrust vector of each of thrusters 6, 7 back and forth according to the desired yaw angle direction, while keeping both thrusters forward without tilting them.

Tow methods are available for controlling roll angle. One is by controlling the roll direction and speed by tilting the thrusters 6 and 7 in the opposite directions, one upward and the other downward. The other method is by tilting each thruster upward and downward simultaneously and by applying opposite thrust vectors according to the desired roll direction. These methods are implemented via the control system 1 which can be remotely controlled by radio frequency from the ground for operating the tilting mechanisms 4, 5.

In the case of the above-mentioned embodiment, reversible thrusters which have tilting mechanisms are used as the propulsion and attitude control system. Alternatively, however, this system can be constituted as a pair of helicopter rotors which respectively have a collective pitch control system and a cyclic pitch control system.

In case of using helicopter rotors, the pitch angle can be controlled by changing the blade pitch of both sets of rotors cyclicly and creating a moment to pull the airship nose up or down.

Figure 5:
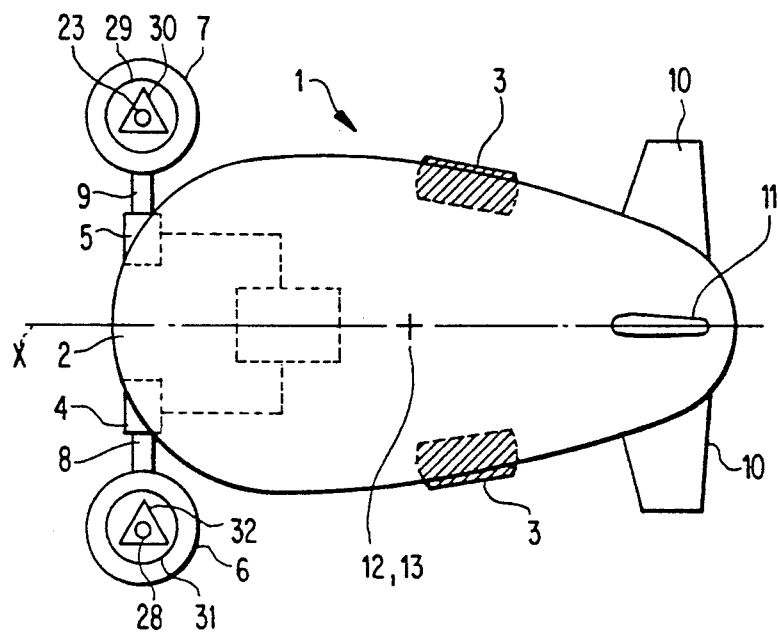
Figure 6:
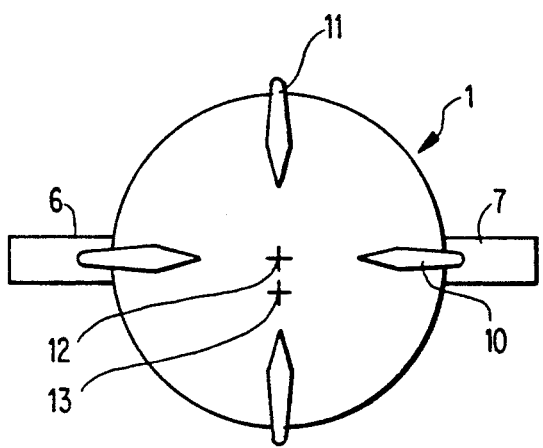

In FIGS. 5 and 6, features 6 and 7 show the rotating disks of the helicopter rotor blades. Therefore, rotor hubs 23 and 28 are located in the center of the disks 6 and 7, respectively, and are perpendicular to the rotating disk circle surfaces of 6 and 7. These rotor hubs 23 and 28 form the center axes of the rotor blade movements as well as being the axles to which the rotor blades are connected, respectively. Rotational driving forces are transmitted from the hubs 23 and 28 to all rotor blades. The cyclic pitch control mechanisms are represented by 29 and 31 and the collective pitch control mechanisms are represented by 30 and 32.

Yaw angle of the airship can be controlled by applying the opposite collective pitch controls in such way that they generate a moment in the desired yaw direction relative to the airship.

Roll angle can be controlled by generating a pair of reactional moments regarding the respective rotor axes in the desired roll direction by changing the respective rotors' collective pitch angles, and thereby generating a deviation between the main axis' torques of the right and left rotors.

Owing to its quasi-axi-symmetrical hull, the airship of this invention has the following specific features:

improved swift response in maneuvers, capability of compact acrobatic performances in a limited small air space, simple structure and, therefore high reliability, especially high suitability for extra small airships which are hard to realize within specified weight limits, attitude control system which directly utilizes the airship's propulsion power, and therefore does not need an additional large-power supply for attitude controls, and a hull which requires considerably less reinforcement than a hull equipped with high powered thrusters, etc.

These special features provide the airship according to the invention with enhanced maneuverability without loss of the high energy efficiency inherent to airships. As a result, the airship enjoys low operating cost and increased durability, which are indispensable features particularly for a small toy-type airship operatable by a radio control system.

I claim:

1. An airship comprising: a hull having an axi-symmetrical shape, the overall configuration of which is symmetrical with respect to horizontal and vertical planes which include the hull axis, the fineness ratio of the hull being 0.5-3.5, at least one bag installed inside of the hull and filled with buoyant gas, a center of gravity located under a buoyancy center by a distance not greater than 20% of the maximum hull radius, a pair of propulsion and attitude controlling means for yaw, pitch, and roll attitude control, one located on either side of the hull axis at a distance in the fore and aft direction from the hull nose not greater than 20% of the total hull length, and external tail fins which have a total fin area A of $$0.1 \times Q^{\frac{2}{3}} \leq A \leq 1.5 \times Q^{\frac{2}{3}}$$

wherein Q is the total hull volume.

2. An airship according to claim 1, wherein said propulsion and attitude controlling means comprises a pair of reversible thrusters each having a tilt mechanism and a switching mechanism for switching its thrust vector back and forth.

3. An airship according to claim 1, wherein said propulsion and attitude controlling means comprises a pair of helicopter rotors each having a collective pitch control mechanism and a cyclic pitch control mechanism.

* * * * *